(12) United States Patent
Tuzar et al.

(10) Patent No.: US 8,598,999 B2
(45) Date of Patent: Dec. 3, 2013

(54) CUSTOMIZABLE INDICATING INSTRUMENT

(75) Inventors: Gert-Dieter Tuzar, Leichlingen (DE);
Christina Werner, Wuppertal (DE);
Andreas Deubzer, Köln (DE); Volker Dreisbach, Köln (DE)

(73) Assignee: Johnson Controls GmbH, Burscheid (DE)

( * ) Notice: Subject to any disclaimer, the term of this patent is extended or adjusted under 35 U.S.C. 154(b) by 311 days.

(21) Appl. No.: 12/677,245

(22) PCT Filed: Jul. 2, 2008

(86) PCT No.: PCT/EP2008/005398
§ 371 (c)(1),
(2), (4) Date: Jul. 1, 2010

(87) PCT Pub. No.: WO2009/033518
PCT Pub. Date: Mar. 19, 2009

(65) Prior Publication Data
US 2010/0302018 A1    Dec. 2, 2010

(30) Foreign Application Priority Data
Sep. 10, 2007    (DE) .......................... 10 2007 042 649

(51) Int. Cl.
*B60Q 1/00*    (2006.01)
(52) U.S. Cl.
USPC ..................... 340/425.5; 340/815.4; 340/461; 455/566; 345/156; 116/284
(58) Field of Classification Search
USPC ..................... 340/425.5, 815.4, 461; 455/566; 345/156; 116/284
See application file for complete search history.

(56) References Cited

U.S. PATENT DOCUMENTS

| | | | | |
|---|---|---|---|---|
| 6,333,697 B1 * | 12/2001 | Kumazawa et al. | ....... | 340/815.4 |
| 6,373,472 B1 * | 4/2002 | Palalau et al. | .................. | 345/173 |
| 6,636,197 B1 * | 10/2003 | Goldenberg et al. | ......... | 345/156 |
| 6,667,726 B1 * | 12/2003 | Damiani et al. | ............... | 345/1.1 |
| 6,705,659 B2 * | 3/2004 | Suzuki et al. | .................... | 296/70 |
| 6,788,196 B2 * | 9/2004 | Ueda | ............................. | 340/459 |
| 6,859,687 B2 * | 2/2005 | Obradovich et al. | ............ | 701/1 |
| 6,903,652 B2 * | 6/2005 | Noguchi et al. | ........... | 340/425.5 |
| D553,577 S * | 10/2007 | Seed et al. | .................... | D13/162 |
| 7,369,044 B2 * | 5/2008 | Ono et al. | ..................... | 340/461 |

(Continued)

FOREIGN PATENT DOCUMENTS

| | | |
|---|---|---|
| DE | 102005 35 481 A1 | 2/2007 |
| EP | 1 526 029 A1 | 4/2005 |
| EP | 1 769 963 A2 | 4/2007 |
| JP | 10-297319 | 11/1998 |

OTHER PUBLICATIONS

International Preliminary Report of Patentability mailed Apr. 10, 2010 in PCT/EP2008/005398, 7 pages.

(Continued)

*Primary Examiner* — Benjamin C Lee
*Assistant Examiner* — Quang D Pham
(74) *Attorney, Agent, or Firm* — Foley & Lardner LLP (57) ABSTRACT

The invention relates to a combination instrument comprising at least one first zone and one second zone, in which respective driver-relevant data can be displayed. The invention also relates to a method for customizing a combination instrument.

5 Claims, 10 Drawing Sheets

(56) References Cited

U.S. PATENT DOCUMENTS

| | | | |
|---|---|---|---|
| 7,680,574 B2* | 3/2010 | Berg et al. | 701/41 |
| 7,683,771 B1* | 3/2010 | Loeb | 340/461 |
| 7,742,857 B2* | 6/2010 | Iwamoto et al. | 701/36 |
| 8,099,209 B2* | 1/2012 | Tschirhart | 701/36 |
| 8,151,207 B2* | 4/2012 | Shimazu et al. | 715/772 |
| 2002/0080043 A1* | 6/2002 | Damiani et al. | 340/815.4 |
| 2003/0109290 A1* | 6/2003 | Moffi et al. | 455/569 |
| 2003/0128103 A1* | 7/2003 | Fitzpatrick et al. | 340/425.5 |
| 2003/0216816 A1* | 11/2003 | Ito et al. | 700/17 |
| 2004/0172182 A1* | 9/2004 | Pathare | 701/36 |
| 2004/0228639 A1* | 11/2004 | Badovinac et al. | 399/8 |
| 2005/0235209 A1* | 10/2005 | Morita et al. | 715/716 |
| 2005/0280514 A1* | 12/2005 | Doan | 340/425.5 |
| 2006/0155441 A1* | 7/2006 | Berg et al. | 701/41 |
| 2006/0241838 A1* | 10/2006 | Mongiardo et al. | 701/50 |
| 2007/0052545 A1* | 3/2007 | Le Gallic | 340/815.4 |
| 2007/0114114 A1* | 5/2007 | Park et al. | 200/4 |
| 2007/0119484 A1* | 5/2007 | Kwon et al. | 134/58 R |
| 2007/0132572 A1* | 6/2007 | Itoh et al. | 340/462 |
| 2007/0143003 A1* | 6/2007 | Chien | 701/200 |
| 2007/0158442 A1* | 7/2007 | Chapman et al. | 236/1 C |
| 2008/0185272 A1* | 8/2008 | Otani et al. | 200/318 |
| 2008/0204205 A1* | 8/2008 | Yamamoto et al. | 340/425.5 |
| 2008/0238874 A1* | 10/2008 | Yamamoto et al. | 345/163 |
| 2009/0112389 A1* | 4/2009 | Yamamoto et al. | 701/29 |
| 2009/0234529 A1* | 9/2009 | Sampedro Diaz et al. | 701/29 |
| 2009/0315865 A1* | 12/2009 | Liang et al. | 345/184 |
| 2010/0002138 A1* | 1/2010 | Chen et al. | 348/564 |
| 2010/0005419 A1* | 1/2010 | Miichi et al. | 715/828 |
| 2010/0321176 A1* | 12/2010 | Hofmann et al. | 340/438 |
| 2011/0187550 A1* | 8/2011 | Ringenwald | 340/815.4 |
| 2012/0075120 A1* | 3/2012 | Barbieri | 340/946 |

OTHER PUBLICATIONS

International Search Report corresponding to PCT/EP2008/005398, dated Mar. 2, 2009, 2 pages.

Office Action in JP Appln No. 2010-523290 dated Dec. 19, 2012 (Translation Only).

* cited by examiner

CUSTOMIZABLE INDICATING INSTRUMENT

CROSS-REFERENCE TO RELATED APPLICATIONS

This is a National Stage application of PCT/EP2008/005398, filed Jul. 2, 2008, which claims the benefit and priority of German Patent Application No. 10 2007 042 649.8, filed Sep. 10, 2007. The foregoing applications are incorporated by reference herein in their entirety.

The invention relates to a combination instrument having at least a first zone and a second zone in which driver-related data can be respectively displayed. Furthermore, the invention relates to a method for configuring a combination instrument.

Display instruments which are based on a graphic display means, for example a dot matrix display, are prior art and are known, for example, from DE 10 2005 035 481 A1. However, these displays have a limited configuration freedom and can only be handled with comparative difficulty.

The object of the invention has therefore been to make available a combination instrument or a method for configuring combination instruments which can be easily handled in a flexible way.

The object is achieved with a combination instrument having at least a first zone and a second zone in which driver-related data can be respectively displayed, wherein the first zone is configured as an interaction display, and the second zone is configured as a storage zone.

According to the invention, the combination instrument has a display, for example a thin-film transistor TFT- or LCD display. This display is divided at least into a first zone and into a second zone in which information can be respectively displayed for the vehicle occupants. Next to a centrally arranged first zone, there are preferably two further display fields, the second zones, which adjoin on the left and right sides, wherein the speed display which is indispensable during travel is particularly preferably always provided in the first zone. Vehicle information, such as for example, the speed, the assistance information such as for example information from the navigation system, from the telephone and/or from the infotainment system and/or a warning message, can be displayed in the first zone. In particular, the first zone serves as an interaction display for configuring the combination instrument. In the first zone it is possible to select information or information displays which are then stored in the second zone. When the vehicle is stationary, a completely different type of display may be preferred to that in travelling vehicles.

The at least one second zone may be unoccupied (empty display) or it can present a display which has been assigned to it via the average central display field.

The first zone preferably has an interactive selection zone, with which it is possible to select which information, relating, for example, to vehicle functions and/or assistance functions can be viewed at least in subzones of the interaction display. The selection zone is preferably located in the lower part of the first zone in which there is less information competition. Various information items relating to vehicle functions and/or assistance functions are arranged in rows in the selection zone, which items can be selected and then viewed, in particular, in an enlarged form in the first zone. The representation of this information is then particularly preferably stored by the first zone, the interaction display, and can be moved into the second zone, the storage zone and stored there, with the result that the information can be viewed there until other information is selected by the user and/or no display is to occur in this zone. If two or more storage zones are present, the user can decide which storage zone the information is stored in.

The combination instrument according to the invention preferably prevents the same information being displayed in duplicated fashion in one of the zones. This may be done, for example, in that information which is already displayed is removed automatically from the display as soon as the user selects it once more.

Furthermore, the combination instrument according to the invention is preferably configured in such a way that warning messages are always immediately displayed, particularly in the first zone, even if the user is currently interacting with the combination instrument. The warning message can be viewed in this zone, in particular, until it is acknowledged by the user. The message can then be reduced in size and/or remain visible in another zone until the reason for the warning has been eliminated.

The combination instrument preferably has an input means with which the information which is shown in the interaction display can be selected. Accordingly, the input means can be used by the user to find out which information can be viewed in the first zone. The input means can be any input means known to a person skilled in the art. However, the input means is preferably a rotary pushbutton knob. The rotary switch can be used to scroll through the different information items which can be viewed, for example in the display zone. The respective information is selected by pressing on the input means and said information can be viewed, preferably in an enlarged form, and particularly preferably in the first zone. The information can then remain in said zone or be moved into the second zone.

For this reason the input means has a distributor with which the information which is shown in the interaction display can be moved into the storage zone. The distributor is, for example, a pushbutton switch. A distributor is preferably assigned to each second zone. As soon as the distributor is activated, the information which is shown in the first zone is moved into the second zone. After this, the first zone is then at least partially empty or the information which was shown before becomes visible again.

A further subject matter of the present invention is a method for configuring a combination instrument having at least one interaction display and at least one storage zone, in which information is selected, displayed in the interaction display and moved into the storage zone.

The statements made in relation to the combination instrument according to the invention apply equally to the method according to the invention, and vice versa.

According to the invention, in the interaction display selection is made of at least one information item which is then to be displayed in the combination instrument. The information may be, for example, a rotational speed display, navigation system information, audio information, information which an on-board computer makes available and/or telephone information etc.

As soon as this information has been selected, it is displayed in the first zone, and as soon as the user wishes it is moved into the at least one storage zone where it remains visible until the user selects other information or no information for this zone. This process can be repeated as often as desired.

The selection is preferably carried out with an input means, preferably by turning and pressing.

In the text which follows, the inventions will be explained with reference to the three-part display scheme which is widespread in conventional display instruments and in which, next to the centrally arranged, most important central instrument, there are two further display fields which adjoin on the left and right sides, wherein the indispensable speed display is always provided by the central instrument. The centrally arranged zone is the first zone, and the displays which are arranged on the right and left are the second zones according to the invention. A person skilled in the art recognizes that the statements made here apply to the driving mode, and when the vehicle is stationary a completely different type of display may be preferred.

The lateral display fields may be unoccupied (empty display) or they may display an assigned display which has been assigned to them via the central display field. For this purpose, the group of operator control elements has two assignment devices which are arranged on each side of a centrally positioned selection device, preferably embodied as pushbutton keys. The assignment of a display function is carried out in a multi-step process. In the first step, a function comprising an offered set of functions is pre-selected. For this purpose, it is preferred to offer all the selectable functions to the driver in a permanent display by means of, in each case, a symbol, wherein the functions are linked with the same hierarchy. In particular, the symbols may be positioned, for example, equidistantly on an annular graphic element which is displayed continuously in the outer part of the central display zone. A rotational movement of the central selection device of the operator control group causes corresponding rotation of the annular graphic element to be initiated and the operator continues this until the desired function is congruent with a selection marking positioned on a fixed position of the central display zone. It is advantageous to display the respective function here in a highlighted fashion, for example by color coding or by an enlarged display: to this extent it would be preferable to assign the selection marking a magnifying glass function here. The process step of pre-selection is completed by a confirmation action. Pressure on the central selection device is well suited for this and accords well with the operator's intuition.

By closing off the pre-selection, the display function is firstly assigned to the central part of the central display zone where it is at least temporarily displayed. If no further operator control action is carried out within a time interval starting from this moment, this results in the status of the pre-selection being automatically deleted for this function; and as a result of this the central display zone preferably returns to the initial state which was present before this. If a different display function was set beforehand, this function is preferably visible again, and otherwise the basic state is preferably assumed. This is preferably the display of a speed instrument over the entire surface, preferably with an edge-side display of the speed being always present for any possible configuration state.

In the next step, the function is optionally assigned to the corresponding, lateral display zone by activating one of the lateral operator control elements. As a result, the display "migrates" from the central display zone to the location where it remains active until the operator performs a further configuration action. This may be overwriting of the display function in the lateral display zone by another display function, which takes place in the previously described fashion as a re-assignment of the central display zone, or cancelling of the display function in the lateral display zone by performing a further selection action in the central display zone, which further action is directed at the same function which has already been displayed. After this it can be assigned to the lateral display zone lying opposite, or its display in the display instrument ends automatically after the expiry of the above-mentioned time interval.

In addition to the configuration which is directed at the lateral display zones, the central display zone can also be configured for the continuous display of a display function. In this case, the concluding step of the selection process is the confirmation of the pre-selection with effect on the central display zone, preferably in the form of a further pressure on the central operator control element.

In one preferred embodiment, there is provision that warning messages in the middle part of the central display zone are, where necessary, automatically displayed and their further treatment takes place in the context of the described configuration possibilities. These possibilities may be assigned to one of the lateral display zones in order to be present permanently in the field of vision of the vehicle driver, or their further display can be temporarily or permanently prohibited by means of an operator control action which is set up as an acknowledgement.

In a further preferred embodiment, the assignment of a function to one of the lateral display zones is connected to the setting up of a link to further operator control elements which are related to this function. This may relate, for example, to a distance warning device or to an automatic cruise controller which become active through calling up of the corresponding display, and the parameterization of which it must be possible to influence subsequently.

In the text which follows, the invention will be explained with reference to the figures. These explanations are merely exemplary and do not restrict the general inventive concept. The explanations apply equally to the combination instrument according to the invention and to the method according to the invention.

Figure 1:
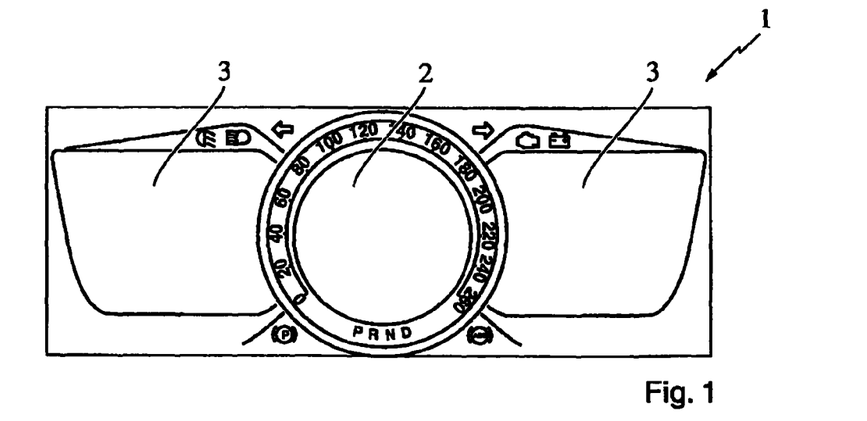
FIG. 1: shows a layout of the central display zone and of the two display zones surrounding it.

FIG. 1 shows the combination display according to the invention which has a first zone 2 and a second zone 3 to the right and left thereof. In the first zone 2, a speed display is arranged in an annular shape, with the pointer not being displayed. The first zone 2 serves as an interaction display and for displaying desired information, and the second zones 3 serve as storage zones for desired information. A person skilled in the art understands that the information is generally not static and can change.

Figure 2:
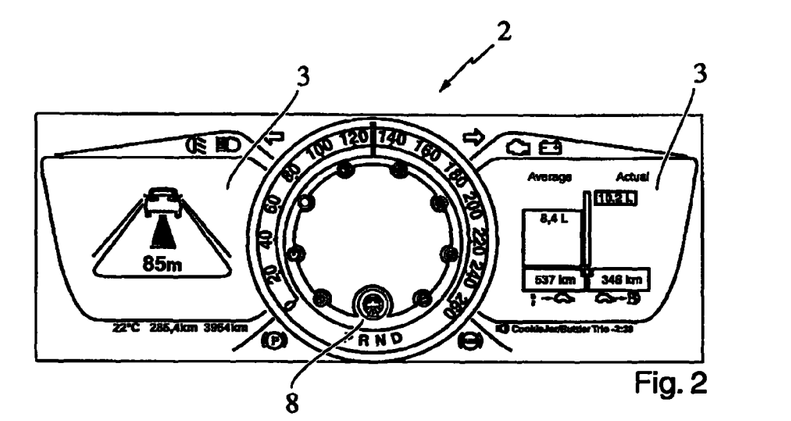
FIG. 2: shows a possible view in which all three display zones are assigned display functions.

FIG. 2 shows the combination instrument according to FIG. 1 in which in addition a selection zone 8 whose function is explained in more detail below is displayed in the first zone 2. Furthermore, information is stored in the storage zones 3 in the present display. The left-hand storage zone 3 shows a distance display, while in the right-hand storage zone the current and the average petrol consumption as well as the distance which can be still covered with the existing level of filling of the tank are displayed.

Figure 3:
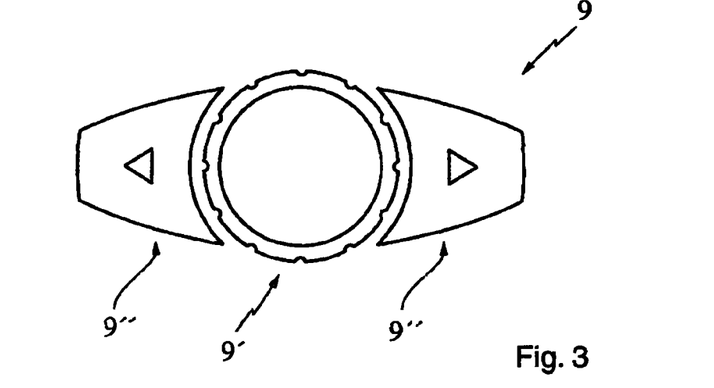
FIG. 3: shows the input means.

FIG. 3 shows an input means 9 which is composed in the present case of a rotary pushbutton knob 9' as well as two distributors 9". With the input means, in particular with the rotary pushbutton knob 9' it is possible to select which information is displayed in the first zone 2. With the distributors 9" it is possible to distribute the information from the first zone 2 to the right-hand or left-hand storage zone 3.

Figure 4:
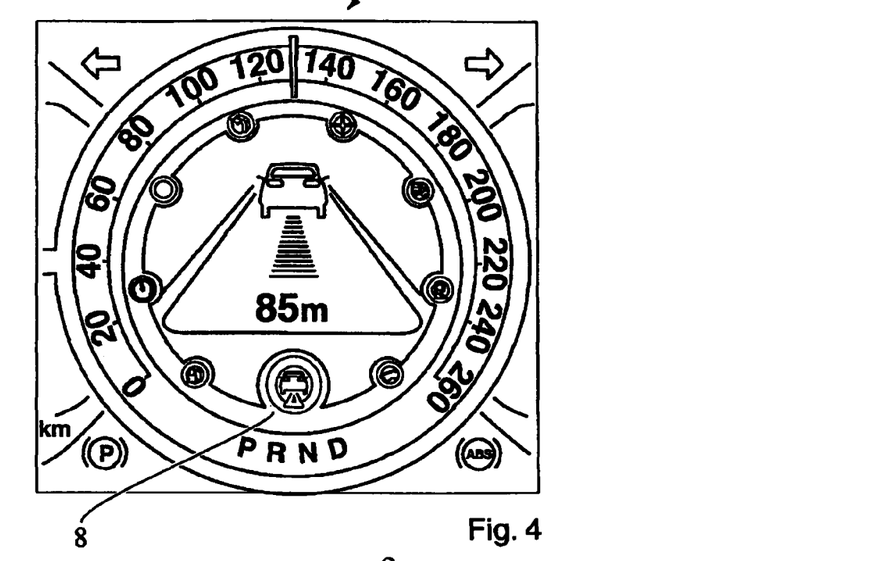
FIG. 4: shows details of the first zone.

FIG. 4 shows a detail of the first zone 2, the interaction display. The selection zone 8 can be seen in the form of a ring with nine symbols with which different functions can be called up and selected. In the 6 o'clock zone, i.e. in the lower zone of the interaction display 2, the symbol of an automatic cruise controller is enlarged and, if appropriate, highlighted in an illuminated fashion. This display clarifies to the user that this symbol can be selected by, for example, pushing the rotary pushbutton knob 9', which has actually taken place in the present case because the information of the automatic cruise controller can be seen in enlarged form in the zone 2. The individual symbols can be moved into the 6 o'clock position by rotating the rotary pushbutton knob 9' in the clockwise direction and in the counter clockwise direction and can be selected by pressing the knob 9' and displayed in an enlarged form in the zone 2 by.

Figure 5:
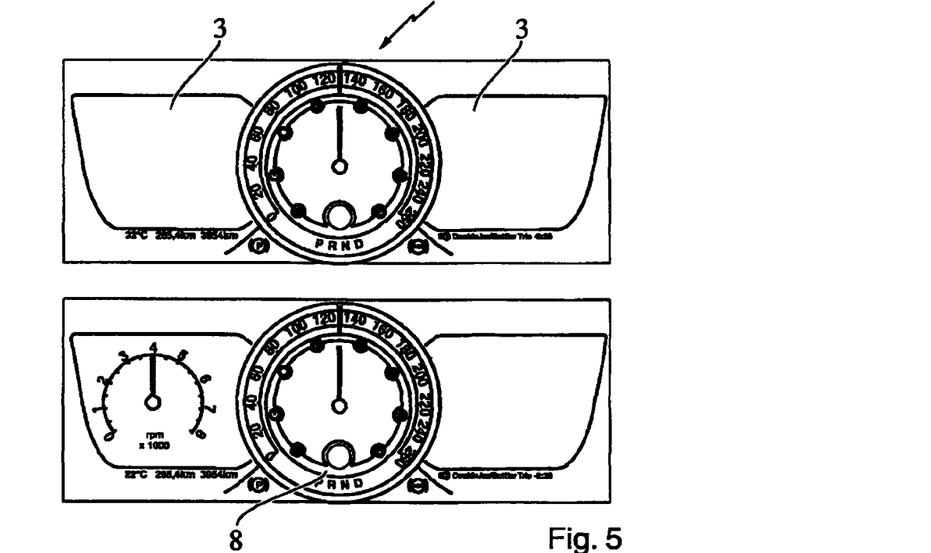
FIG. 5: shows process steps of the assignment of a display function by the central display zone to the left-side display zone.

FIG. 5 shows the method steps of the selection and storage of information. In the upper part of FIG. 5, a rotational speed controller has been selected in the interaction display 2 by rotating and pressing the rotary pushbutton knob 9'. The left-hand distributor 9" has then been pressed, with the result that the rotational speed meter moves into the left-hand storage zone 3. The rotational speed meter can therefore no longer be seen in the interaction display 2, with the result that the latter can be used for selecting further information items.

Figure 6:
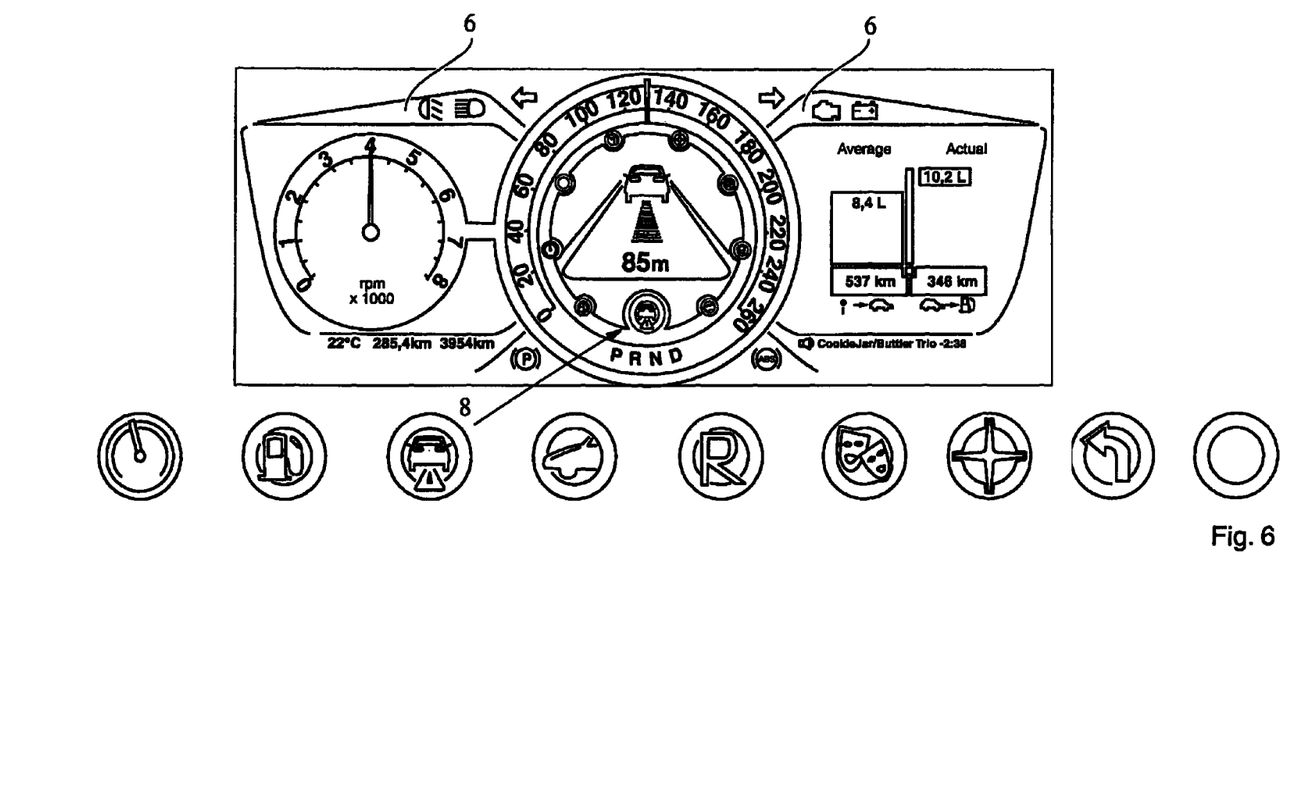
FIG. 6: shows the selection of the display.

FIG. 6 shows a further display of the combination instrument according to the invention. In this case it is additionally illustrated that the combination instrument can also have vehicle control symbols 6 such as, for example, light, dipped headlights, oil pressure and the battery function. Furthermore, additional information about the Infotainment system, the external temperature, a day kilometer counter as well as the total number of kilometers traveled can also be displayed. It is also possible to see that within the speed display nine symbols are displayed in an annular shape in the display zone 8, which symbols can be selected in the 6 o'clock position. The symbols are enlarged and/or displayed in an illuminated fashion in the 6 o'clock position, symbolizing to the user that he can select them. In the lower part, the symbols are displayed in an enlarged form.

Figure 7:
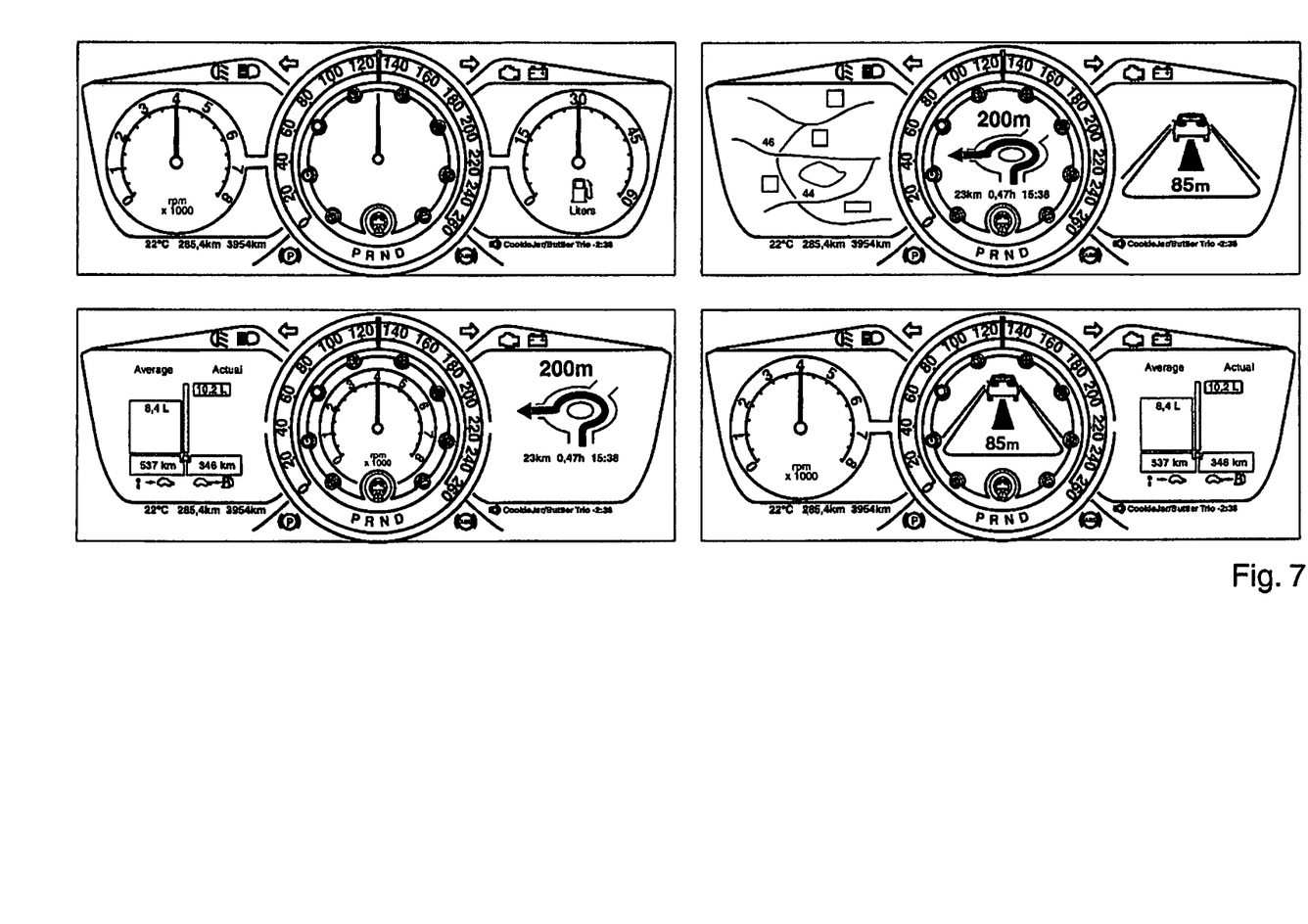
FIG. 7: shows exemplary configurations.

FIG. 7 shows four possible configurations of the combination instrument according to the invention. In the upper left-hand illustration, no information is provided in the first zone 2, the interaction display, while the left-hand storage zone 3 shows the rotational speed and the right-hand storage zone 3 shows the filling level of the tank. In the upper, right-hand illustration, the directional instruction of the navigation system is displayed in the first zone 2. In the left-hand storage zone 3, a road map is shown, and in the right-hand storage zone 3 information relating to the distance is shown. In the left-hand, lower illustration, the rotational speed is shown in the first zone 2, the average petrol consumption is shown in the left-hand storage zone 3, and the current petrol consumption and the kilometers which are still available and can be traveled with the existing level of filling of the tank are shown in the left-hand storage zone 3, and details on the route to be traveled along are shown in the right-hand storage zone. The right-hand, lower illustration shows information about the distance in the first zone 2, while the left-hand illustration displays the rotational speed, and the right-hand illustration displays the petrol consumption described above. A person skilled in the art understands that the combination instrument according to the invention is accordingly capable of being configured and changed as desired. All the information can be displayed in all the zones 2, 3. It is selected in the first zone 2 and displayed there and/or moved into the second zone.

Figure 8:
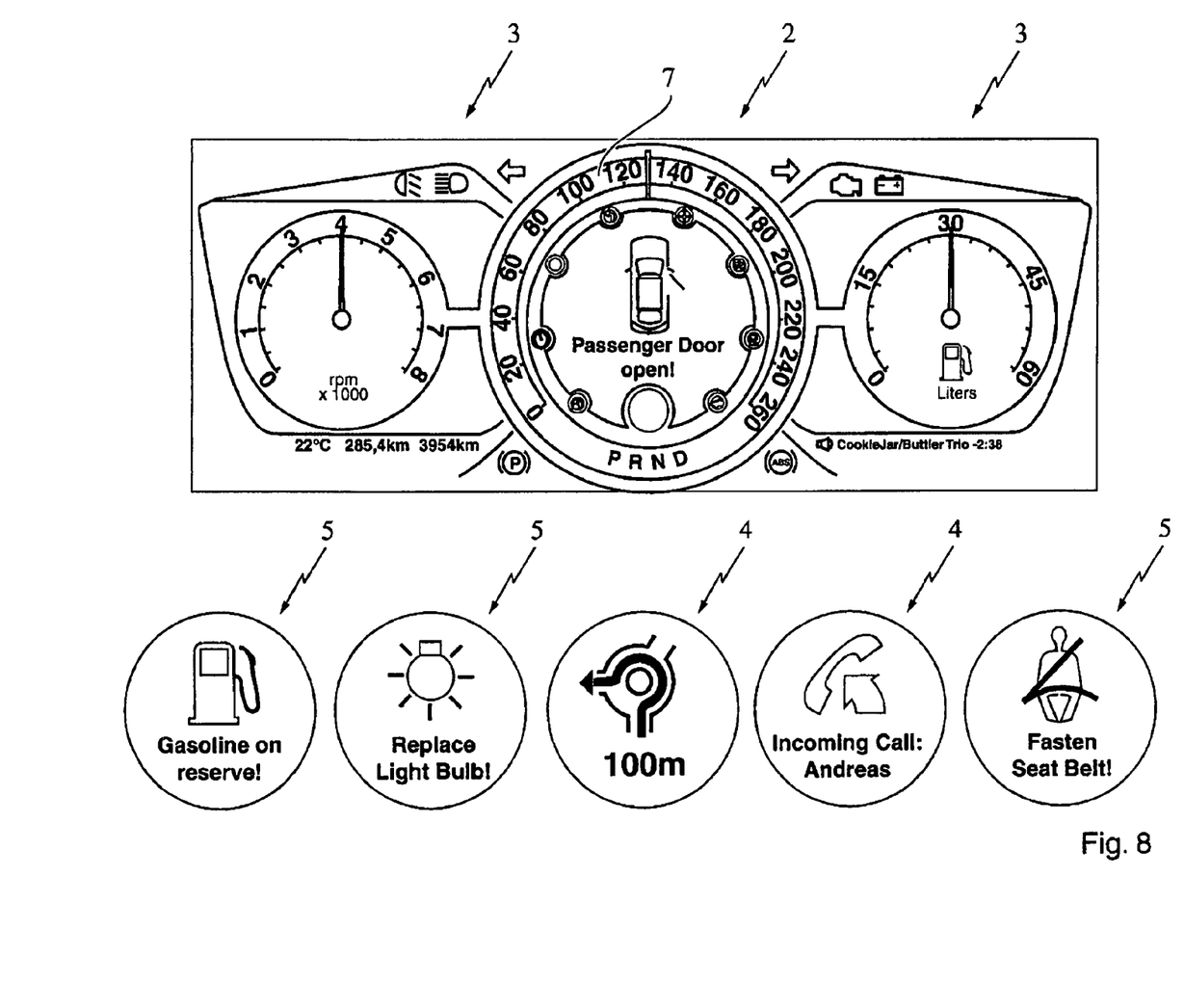
FIG. 8: shows the display of warning messages.

The display of messages with a high priority is shown in FIG. 8. All the vehicle-related messages with a high priority such as warning and instructions are overwritten, at least for a certain time period, over the current information contents in the first zone 2, and do not permit any further actions in this zone for this time period. As a result, the driver's attention is drawn exclusively to important events. This information can either be acknowledged, and therefore disappear, or it can be acknowledged and transferred to one of the storage zones.

Figure 9:
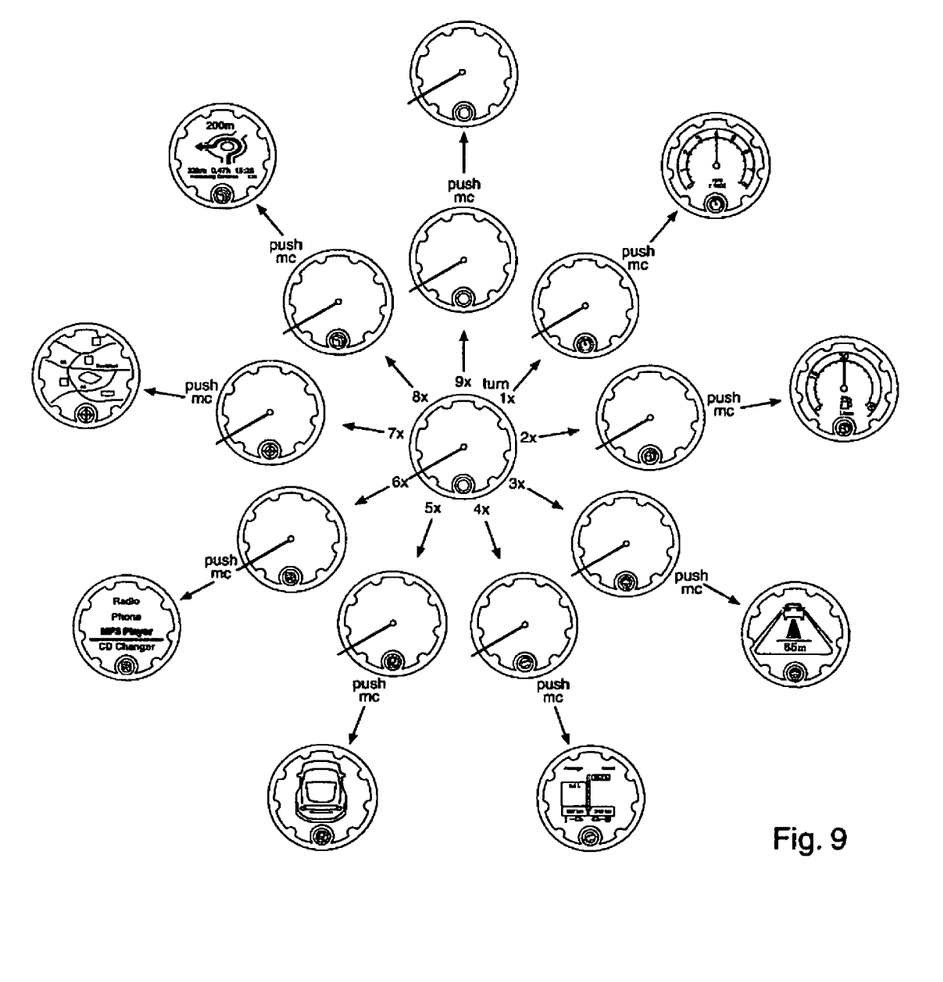
FIG. 9: shows the selection method.

FIG. 9 shows the method for selecting the information on the interaction display. The desired information is generally selected from the selection zone 8 by rotating the knob 9', and the view thereof is called by pressing this knob. The initial position in the zone 2 is the display of the speed pointer with its entire length (12 o'clock position).

Figure 10:
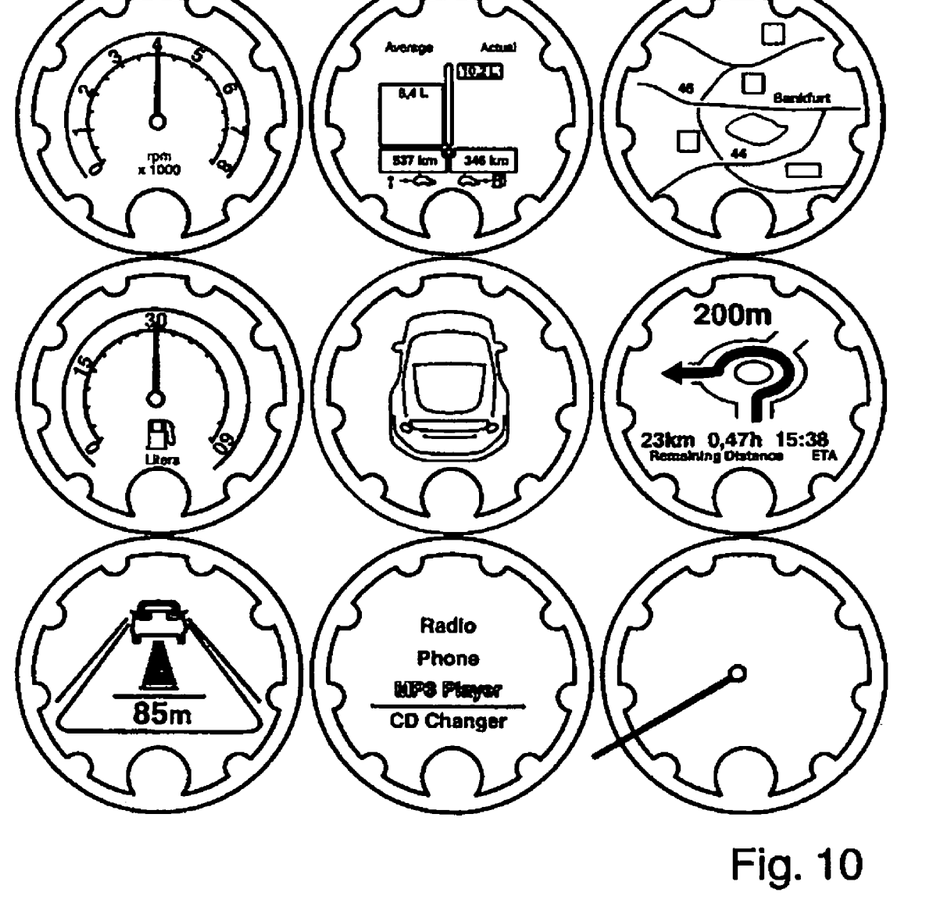
FIG. 10: shows the interaction display.

FIG. 10 shows the behavior of the zone 2 over time. The selection of information 8 in the interaction plane 2 is carried out with the rotary pushbutton knob 9' in the clockwise direction and in the counter-clockwise direction. In the active mode, when the input element 9 is activated, the interaction plane is embodied prominently in terms of its form. In the passive mode or in the sleep mode, which occurs after a defined time period when no interaction takes place with the input element 9, only the interaction plane is displayed in a reduced form. This property permits efficient utilization of the display area in the first zone 2 and reduces the information density in the instrument.

Figure 11:
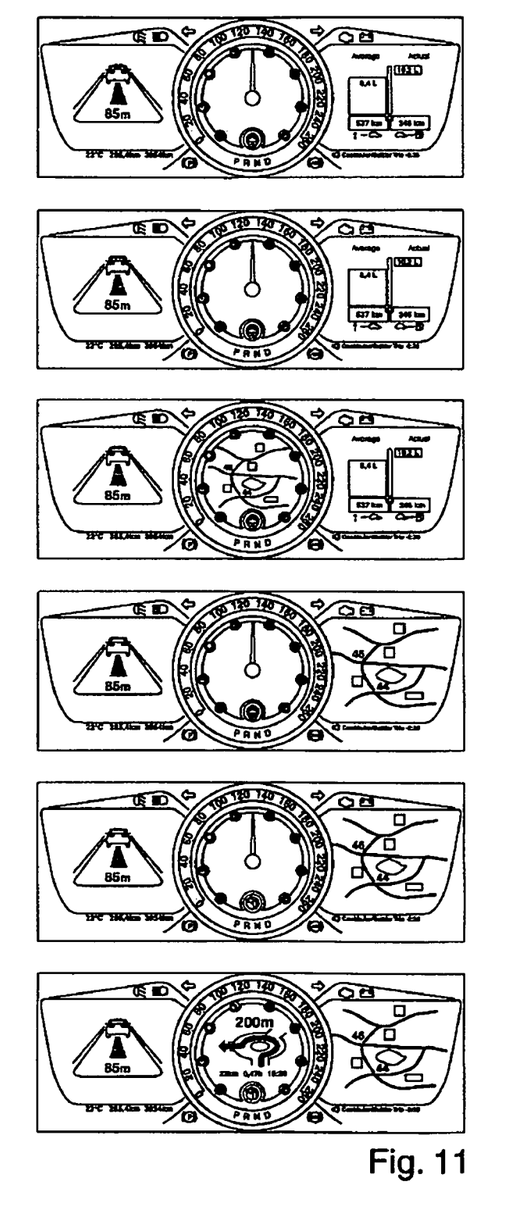
FIG. 11: shows the distribution of the information.

FIG. 11 shows once more the method for distributing the information. After this, information which was previously displayed in the first zone 2 can be moved to the right or to the left in the combination instrument with the distribution pushbutton key 9" on the input element, and can be stored, which is shown in the two upper illustrations. The four lower illustrations show, by way of example, re-distribution of the information in the storage zones 3. Starting from a combination of the distance display and speed display and the on-board computer ranging as far as the distance pointer, navigation arrow display and map display.

Figure 12:
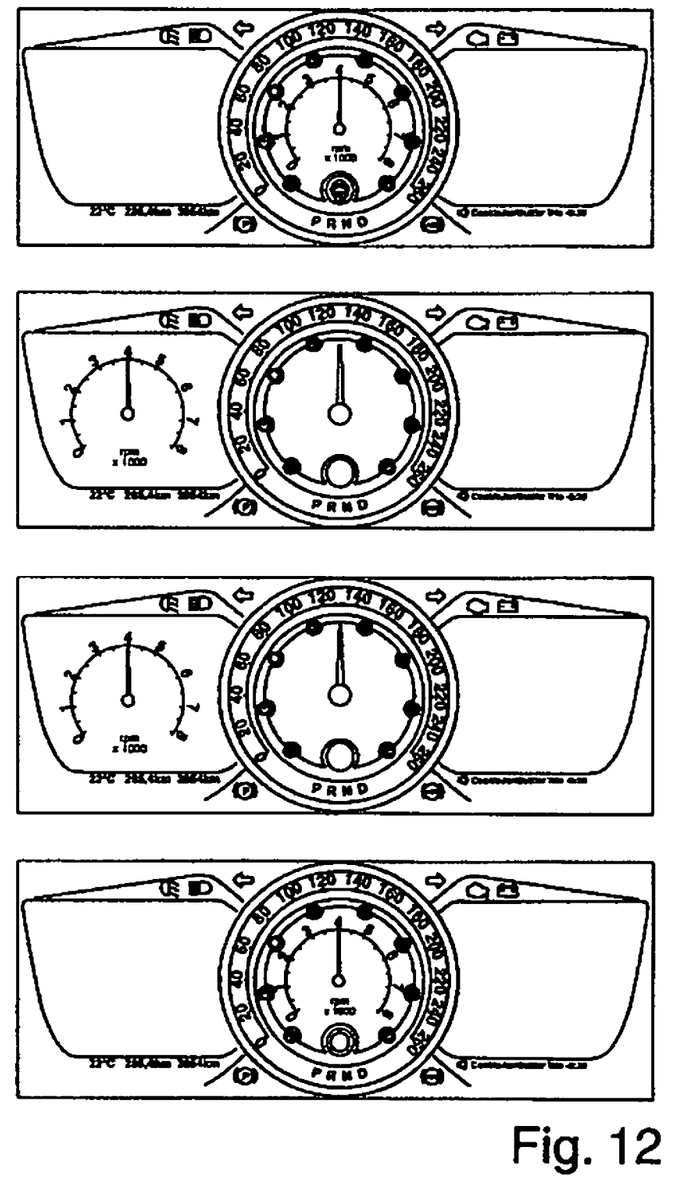
FIG. 12: shows the avoidance of double assignments.

FIG. 12 shows the behavior of the system for the prevention of duplicated information. The previously selected information which was moved into the storage zones 3 is removed from the lateral position at the moment if the user decides to allow the same function to be displayed in the central zone 2. From this state, the driver can decide to leave the information in the center or to move it to the right to the left or store it. During distribution and then during the removal of information, the system reacts to the commands directly and without delay. Existing representations are all removed from the display and the moved information is included in a new position.

Figure 13:
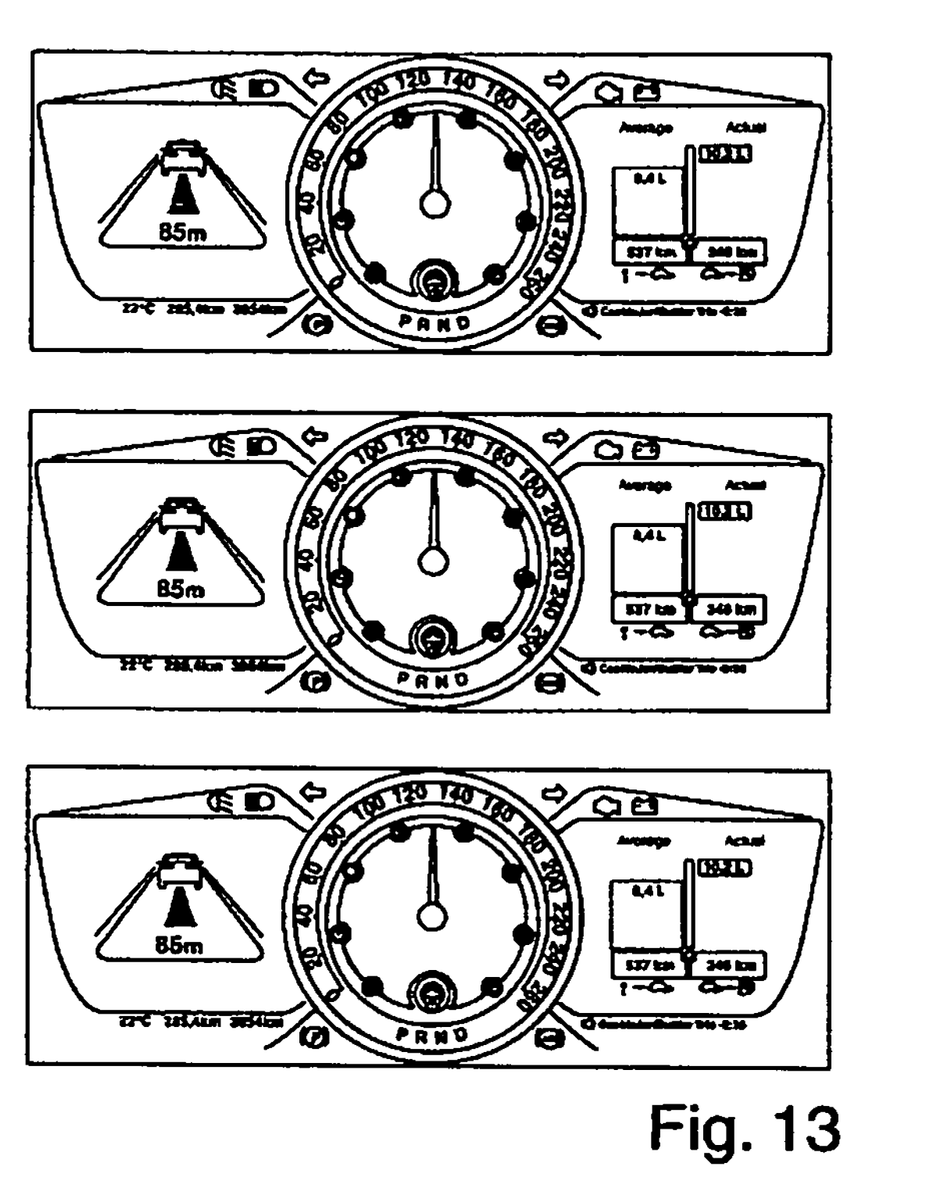
FIG. 13: shows the behavior of the system when confirmation fails to occur.

FIG. 13 shows the behavior of the system when the focus shifts and the confirmation then fails to occur. If the focus is visibly changed in the menu selection ring 8 but the selection is then not confirmed and the menu selection ring subsequently returns to the sleep mode, the focus display (6 o'clock position) in the selection ring menu 8 returns to the displayed symbol which represents the function in the zone 2.

LIST OF REFERENCE NUMERALS

1 Combination instrument
2 First zone, interaction display

3 Second zone, storage zone
4 Vehicle information, route information, Infotainment information
5 Warning messages
6 Vehicle control symbols
7 Speed display
8 Selection zone
9 Input means
9' Rotary pushbutton knob
9" Distributor

The invention claimed is:

1. A combination instrument for displaying information related to vehicle functions and/or assistance functions in a vehicle to a vehicle occupant, the combination instrument comprising:
   a first zone configured as an interaction display for configuring the combination instrument to display a set of information related to the vehicle functions and/or the assistance functions that can be selected; wherein the first zone comprises an interactive selection zone that is located in a lower part and configured to display a subset of the set of information displayed in the first zone;
   an input comprising a rotary pushbutton knob, a left distributor, and a right distributor; the rotary pushbutton knob configured to change the subset of the set of information displayed in the interactive selection zone upon turning the rotary pushbutton knob to select the subset of the set of information that is displayed in the interactive selection zone as selected information; and
   a second zone configured as a storage zone in which the selected information is configured to be displayed and remains visible until the vehicle occupant selects other subset of the set of information or no information, and comprises two display fields which adjoin on the left and right sides of the first zone;
   wherein the selected subset of information, when caused by the rotary pushbutton knob to be displayed in the interactive selection zone, is larger than when displayed in the first zone;
   wherein the selected subset of information is configured to be viewed in an enlarged form in a subzone in the interaction display of the first zone upon pressing the rotary pushbutton knob; and
   wherein a representation of the selected subset of information is configured to be moved from the subzone of the interaction display into at least one of the display fields of the second zone as soon as a corresponding distributor is activated by the vehicle occupant.

2. The combination instrument as claimed in claim 1, wherein at least one of vehicle information, a warning message and interaction information is configured to be displayed in the first zone.

3. The combination instrument as claimed in claim 1, wherein the selection zone comprises a circular selection zone.

4. A method for configuring a combination instrument of a vehicle for displaying information related to vehicle functions and/or assistance functions to a vehicle occupant, having an interaction display and a storage zone, that comprises two display fields which adjoin on the left and right sides of the interaction display, wherein the information displayed in the storage zone remains visible until the vehicle occupant selects other information or no information, the method comprising:
   displaying, in the interaction display, a set of information related to the vehicle functions and/or the assistance functions that can be selected; wherein the interaction display comprises an interaction selection zone that is located in a lower part and configured to display a subset of the set of information in the interaction display;
   selecting the subset of the set of information that is displayed in the interaction selection zone as selected information with a rotary pushbutton knob configured to change the subset of the set of information displayed in the interaction selection zone, wherein the selected information, when caused by rotating the rotary pushbutton knob to be displayed in the interaction selection zone, is larger than when displayed in the interaction display; and wherein the selected information is configured to be viewed in an enlarged form in a subzone of the interaction display upon pressing the rotary pushbutton knob; and
   moving the selected information from the subzone of the interaction display into the corresponding display field of the storage zone upon activating a left distributor input or a right distributor input by the vehicle occupant.

5. The method as claimed in claim 4, wherein the selection zone comprises a circular selection zone.

* * * * *